(12) United States Patent
Tahara et al.

(10) Patent No.: US 7,666,252 B2
(45) Date of Patent: Feb. 23, 2010

(54) METHOD OF PURIFYING LARGE QUANTITY OF EXHAUST GAS CONTAINING DILUTE VOLATILE HYDROCARBONS

(75) Inventors: Hiroshi Tahara, Kawasaki (JP); Hiroshi Nochi, Ichikawa (JP)

(73) Assignees: System Eng Service Co., Ltd, Ichikawa-shi (JP); Yoshiko Tsuru, Tokyo (JP)

( * ) Notice: Subject to any disclaimer, the term of this patent is extended or adjusted under 35 U.S.C. 154(b) by 230 days.

(21) Appl. No.: 11/994,059

(22) PCT Filed: Jun. 26, 2006

(86) PCT No.: PCT/JP2006/312696
§ 371 (c)(1),
(2), (4) Date: Dec. 27, 2007

(87) PCT Pub. No.: WO2007/000960
PCT Pub. Date: Jan. 4, 2007

(65) Prior Publication Data
US 2009/0025554 A1    Jan. 29, 2009

(30) Foreign Application Priority Data
Jun. 27, 2005  (JP)  ............................. 2005-186471
Dec. 2, 2005   (JP)  ............................. 2005-349466

(51) Int. Cl.
*B01D 53/04* (2006.01)
*B01D 53/06* (2006.01)
*B01D 53/44* (2006.01)
(52) U.S. Cl. ................................ 95/95; 95/143; 95/901
(58) Field of Classification Search ............... 95/95–99, 95/104, 107, 113, 141, 143, 901
See application file for complete search history.

(56) References Cited

U.S. PATENT DOCUMENTS
5,085,674 A  *  2/1992  Leavitt .......................... 95/98
(Continued)

FOREIGN PATENT DOCUMENTS
EP        1 459 799 A1     9/2004
(Continued)

OTHER PUBLICATIONS
International Search Report of PCT/JP2006/312696, date of mailing Aug. 15, 2006.
(Continued)

*Primary Examiner*—Frank M Lawrence
(74) *Attorney, Agent, or Firm*—Westerman, Hattori, Daniels & Adrian, LLP

(57) ABSTRACT

A method of purifying an exhaust gas by way of an adsorption unit (adsorption columns 7a, 7b) including an adsorbent layer paced with precoated mesoporous active carbon capable of alternately switched operations of adsorption and desorption, wherein prior to the treatment by way of the adsorption unit, a concentration increase is effected by way of a pre-treatment unit (honeycomb rotor (11) or stationary honeycomb) including an adsorbent layer packed with precoated mesoporous active carbon for concentrating of any dilute volatile hydrocarbon contained in the exhaust gas. Consequently, there can be provided a method of purifying large amounts of exhaust gas with dilute volatile hydrocarbon concentration, in which without emission of carbon dioxide, any volatile hydrocarbon contained can be recovered with extreme easiness as a liquid. Further, there can be provided a purification method in which zero emission is attained with respect to volatile hydrocarbons.

4 Claims, 2 Drawing Sheets

U.S. PATENT DOCUMENTS 7,316,323 B2 * 1/2008 Collias et al. ............... 210/506

FOREIGN PATENT DOCUMENTS

| JP | 59-50715 | B | 12/1984 |
| JP | 4-102623 | U | 9/1992 |
| JP | 09-057060 | A | 3/1997 |
| JP | 11-137944 | A | 5/1999 |
| JP | 2004-042013 | A | 2/2004 |
| WO | 03-057349 | A1 | 7/2003 |

OTHER PUBLICATIONS

"Separation Technology," vol. 33, No. 4, pp. 16-20 and 80, 2003.

* cited by examiner

METHOD OF PURIFYING LARGE QUANTITY OF EXHAUST GAS CONTAINING DILUTE VOLATILE HYDROCARBONS

TECHNICAL FIELD

The present invention relates to a method of purifying an exhaust gas containing a dilute volatile hydrocarbon. The present invention particularly relates to a method of purifying a large quantity of exhaust gas containing dilute volatile hydrocarbons that is emitted into the atmosphere, and especially to a method for purifying a large quantity of exhaust gas containing dilute volatile hydrocarbons related to an adsorption method whose object is to efficiently separate and reclaim the volatile hydrocarbon from the exhaust gas in addition to the object of purifying the exhaust gas to a zero emissions level in order to "prevent global warming" and "environmental pollution," rather than merely combusting the exhaust gas and causing carbon dioxide gas ($CO_2$) to be released into the atmosphere as in the prior art.

BACKGROUND ART

In the past, numerous methods have been proposed for treating an exhaust gas containing volatile hydrocarbons. In particular, combustion, adsorption, absorption, membrane methods, and the like are known as treatment means for preventing pollution and satisfying legally mandated limits for the concentration of volatile hydrocarbons in exhaust.

Among these, combustion methods are advantageous in that the methods can be regarded as the only methods that can achieve zero emissions when treating a large quantity of exhaust gas in which the volatile hydrocarbons contained in the gas are extremely diluted, i.e., a large quantity of exhaust gas in which the content of volatile hydrocarbons is on the order of a few dozen to a few hundred parts per million, and the quantity of the gas is several thousand to several tens of thousand cubic meters per hour. Furthermore, both regenerative combustion methods and autothermal catalytic combustion methods are simpler than an adsorption method, absorption method, membrane method, or other methods, and can be readily carried out extremely inexpensively.

However, the overriding drawback of such combustion methods is that not only is it impossible to reuse the volatile hydrocarbons, a "massive release of carbon dioxide gas" accompanies the combustion. In this respect, exhaust regulations for carbon dioxide gas, which is the primary cause of global warming, have recently been legally mandated by the "Kyoto Protocol," and the combustion method may soon be under debate in consideration of the carbon-emissions tax that may be enacted in the near future.

On the other hand, the adsorption methods, which are widely used as an alternative to the combustion methods, surpass the combustion methods when the concentration of volatile hydrocarbons contained in the exhaust gas is on the order of several percent and the amount of exhaust gas to be treated is several thousand cubic meters per hour or less. Specifically, these methods are advantageous in that the treatment unit is compact, and large quantities of volatile hydrocarbons can be directly recovered and reused without burning.

However, the following problems arise when treating large quantities of exhaust gas containing extremely dilute volatile hydrocarbons. Namely, when a conventional adsorbent is used; e.g., a hydrophobic silica gel, zeolite, or a microporous activated carbon, the time necessary for adsorption, i.e., the contact time with the adsorbent, is determined in advance according to the adsorbent that is used. For example, the contact time for activated carbon is about 2 to 5 seconds, and the contact time for hydrophobic silica gel is 10 to 15 seconds. When the contact time exceeds these standards, the volatile hydrocarbons in the exhaust gas pass through the adsorbent layer before being adsorbed by the adsorbent. Consequently, when a large quantity of exhaust gas is treated, unnecessarily large quantities of adsorbent must be used in order to achieve a contact time necessary for adsorption.

Furthermore, the abovementioned adsorbents, and particularly zeolite or microporous activated carbon, have excellent adsorption performance, but poor desorption performance. The majority of these adsorbents are therefore desorbed as a result of heat desorption caused by steam or by air heated to a high temperature (see Non-Patent Reference 1).

However, the reason why these poorly desorbing adsorbents are still widely used at present is that causing the exhaust gas to pass through the adsorbent, brings the concentration of the dilute hydrocarbons to 5 to 10 times the concentration obtained using the combustion method, in which the dilute volatile hydrocarbons are combusted.

An advantage is accordingly realized in that the hydrocarbons dissolved in water can just barely be recovered even when using steam desorption.

A "fibrous activated carbon system" and a "honeycomb rotor system" are typical examples of systems using these adsorbents.

The "honeycomb system" is advantageous in that dilute hydrocarbons can be increased to a self-combustible concentration by desorption using high temperature air. In this system, which uses a honeycomb-shaped (hexagonal) rotor on which activated carbon or zeolite is specially formed, large quantities of exhaust gas containing dilute volatile hydrocarbons are passed through the rotor, and only the volatile hydrocarbons are adsorbed thereon. The adsorbed portion is transferred to the desorbed portion by the rotation of the rotor, desorbed by air that has been heated to approximately 200° C., and extracted from the system at a self-combustible concentration; i.e., as a concentrated gas having a concentration of approximately 2000 to 3000 ppm. This series of steps can be continually carried out by the rotational movement of the honeycomb rotor.

The "fibrous activated carbon system" and the "honeycomb rotor system" are both well-known in the prior art. However, problems have arisen in that the concentration of the concentrated volatile hydrocarbons is at most 1000 to 5000 ppm, and it is less economical to extract volatile hydrocarbons of this concentration for recovery purposes without causing them to combust. The present inventors have therefore experimented with a novel approach for solving these problems Specifically, 99% or more of the volatile hydrocarbons contained in the exhaust gas can be recovered by changing the adsorbent used in the systems described above to "an agent that can be desorbed merely by the combined use of a vacuum and/or room-temperature nitrogen and ambient air," or by using an adsorption/desorption unit that has been previously developed and proposed by the present inventors (see Patent Reference 1 described below) to treat the thus-extracted volatile hydrocarbons, which have been concentrated to a certain degree.

This agent; i.e., adsorbent, is a novel activated carbon that can be desorbed merely by vacuuming and purging means, rather than heat desorption using steam. For example, an activated carbon using a raw material such as brown coal or peat as a base has been developed in China; an activated carbon having olive pits as a raw material has been developed in the Netherlands; and an activated carbon having specific wood materials as a raw material has been developed in the US. All of these activated carbons have a bore diameter of 10 to 60 Å (1 to 6 nanometers). In automotive vehicles in Europe, the US, and other developed nations other than Japan, obligatorily registered "canisters" comprise such activated carbons. Gasoline vapor that leaks out during travel is adsorbed into these canisters, and, once a certain amount of vapor has accumulated, is desorbed upon fresh air being drawn in from the exterior. The purged exhaust gas is caused to combust in the engine compartment. It is entirely unnecessary for heating to be performed when desorption is performed.

Prior to the present invention, the present inventors had proposed "a method for treating an exhaust gas containing volatile hydrocarbons" using the activated carbon independently, or by combining the activated carbon with synthetic zeolite or hydrophobic silica gel, which are widely used in the prior art, to form multiple layers (see Patent Reference 1).

This treatment method is characterized in being "a method involving the use of an adsorption layer loaded with a mesoporous activated carbon precoated with volatile hydrocarbons, or a multilayered loaded layer in which a similarly precoated hydrophobic silica gel and/or zeolite are combined; during desorption, a purge gas is used in conjunction with a vacuum pump, and the adsorption/desorption switching time is 1 to 30 minutes."

Examples of methods that are related to an adsorption separation technique and that are generally used in the field include "a method involving the use of an activated carbon as an adsorbent; and, during desorption, solely using steam or another similar heating medium to carry out desorption (see Non-Patent Reference 1 cited above)," and "a method involving the use of a synthetic zeolite precoated with gaseous hydrocarbons, hydrophobic silica gel, or another non-combustible adsorbent; and alternating between an adsorption operation and a desorption operation (see Patent Reference 2)."

Housing a cooling coil inside an adsorption column has traditionally been a commonsensical approach for "preventing a massive build-up of heat due to adsorption heat." A method has also been proposed in which volatile hydrocarbons (in liquid form) obtained by cooling a purge exhaust gas are circulated in the adsorption column instead of cooling water (see Patent Reference 3).

[Non-Patent Reference]: "Separation Technology," Vol. 33, No. 4 (of 174 consecutive volumes); published by the Society of Separation Process Engineers; Jul. 31, 2003; pp. 18 to 20.

[Patent Reference 1]: Japanese Laid-open Patent Application No. 2004-42013 (Claim 1)

[Patent Reference 2]: Japanese Laid-open Patent Application No. 09-057060 (Claim 1)

[Patent Reference 3]: Japanese Examined Patent Application No. 59-50715 (Claim 1)

DISCLOSURE OF THE INVENTION

Problems the Invention is Intended to Solve

As can also be seen in Patent Reference 2 cited above, in conventional adsorption methods, synthetic zeolite or hydrophobic silica gel is used, and switching (swinging) between adsorption and desorption processes occurs over 1 to 15 minutes. In other words, conventional methods involve the use of a "swing system." This adsorption method includes ordinary adsorption/desorption switching means, and is not a particularly novel method. However, any of the methods can be considered an excellent method in cases involving the use of exhaust gases that are present in small quantities measuring one thousand cubic meters per hour or less, and that contain hydrocarbons in a dense concentration of ten thousand parts per million or greater.

However, these methods require the use of several adsorption columns that are normally 5 m or greater in diameter and more than 10 m in height. Therefore, such methods are not suitable for treating large quantities of exhaust gas in which the concentration of the hydrocarbons contained therein is at an extreme dilution of 10,000 ppm or less; e.g., several ten to several thousand ppm (i.e., 10 to 2000 ppm), and in which the quantity of exhaust gas far exceeds 10,000 m$^3$. Adsorption/desorption methods using fibrous activated carbon or a honeycomb rotor just barely meet the requirements in this field.

However, such means should be avoided because the recovery rate thereof is less than 90%. Instead, a concept that has gained acceptance of late is that large quantities of such extremely dilute exhaust gas are unmanageable, and will inevitably combust after the extremely dilute hydrocarbons contained therein (approximately several tens to several hundred parts per million) have been concentrated to a self-combustible concentration (approximately 2000 to 6000 ppm). Furthermore, the adsorbent used in a conventional "honeycomb rotor system" is a high-silica zeolite, and "high-temperature purge air" of 150 to 200° C. is necessary to carry out desorption.

In the case that large quantities of an extremely dilute exhaust gas are treated as described above, combustion systems are more economical than the abovementioned methods involving switching between adsorption and desorption. However, despite being able to achieve zero emissions, combustion systems cannot recover volatile hydrocarbons, as described above. Drawbacks are also presented in regard to the massive release of carbon dioxide gas into the atmosphere.

Consequently, a technological demand currently exists for the development of an adsorption method that is able to recover small amounts of volatile hydrocarbons contained in a treated large quantity of a dilute exhaust gas, that produces no carbon dioxide gas emissions, and that is economical.

The present invention was devised in view of the foregoing problems, and provides an adsorption and desorption method that is a continuation of the treatment method disclosed in the abovementioned Patent Reference 1, wherein activated carbon is used independently, or is used in combination with hydrophobic silica gel or synthetic zeolite, and wherein steam or air heated to a high temperature does not need to be used during desorption. The present invention incorporates means for concentrating volatile hydrocarbons contained in large quantities of exhaust gas in a pretreatment stage, and is thereby suitable for treating large quantities of exhaust gas containing dilute volatile hydrocarbons at a concentration of 10,000 ppm or less, and having a volume of more than several thousand cubic meters per hour. The pretreatment stage described above is preferably a "honeycomb-structure rotor system" or a "fixed honeycomb system." Furthermore, the adsorbent used in these systems is the same as in the method used in the main unit (adsorption unit), and is a mesoporous activated carbon precoated with volatile hydrocarbons. In a preferred embodiment of the present invention, the activated carbon is used in conjunction with a hydrophobic silica gel precoated with volatile hydrocarbons, and having a specified average pore diameter of 4 nanometers.

In a preferred embodiment of the present invention, room-temperature air or nitrogen is used as desorption means in the pretreatment stage. Using nitrogen is advantageous in that safety can be ensured even if the concentrated hydrocarbons exceed a combustion lower limit.

The combustion lower limit differs according to the type of hydrocarbons contained in the exhaust gas, but is usually "10,000 ppm in terms of hydrocarbon concentration", and the upper limit is "80,000 ppm in terms of hydrocarbon concentration."

Specifically, the "law related to improving the control and management of the amounts in which specific chemical substances are discharged into the environment;" i.e., the so-called "PRTR law" enacted as of April 2002, is a total emissions regulation for all factories, rather than an emission concentration regulation as has been instituted in the past. Therefore, in order to protect the environment, malodorous gasses generated indoors in petroleum plants, chemical plants, laboratories, pharmaceutical plants, and the like are now not so readily able to be emitted in large quantities to the exterior of the building via ducting.

Consequently, in many plants, coarse particulate, acidic substances, and alkaline substances are first flushed out from the large quantities of exhaust gas released into the atmosphere using a water column, whereupon the exhaust gas is emitted into the atmosphere. However, a problem arises in that uncontrollable amounts of VOC's are not dissolved in the water. Furthermore, the moisture in the emitted exhaust gas is nearly saturated.

These large quantities of dilute exhaust gas have conventionally been treated using a direct combustion system or a catalytic combustion system, as described above. However, emission regulations for carbon dioxide gas are becoming stricter worldwide every year, and these combustion systems will eventually be subjected to review.

With these circumstances in view, the present inventors arrived at the present invention. They did so on the basis of a proposal to "recover the volatile hydrocarbon content as a liquid" in order to "prevent pollution" and "restrict the emission of carbon dioxide gas," wherein large quantities of exhaust gas containing dilute hydrocarbons are treated by combining a novel adsorption method and desorption method that include a pretreatment stage, and that are different from the prior art; all of the volatile hydrocarbons mixed with the exhaust gas are removed; and zero emissions are achieved.

Specifically, a problem that the present invention is intended to solve is to provide a "method for purifying an exhaust gas containing volatile hydrocarbons." According to this method, an exhaust gas in a volume of 1,000 $m^3$/hr or greater having a volatile hydrocarbon concentration of 10,000 ppm or less; in particular, a large quantity of exhaust gas in a volume of more than 10,000 $m^3$/hr and having an extremely dilute volatile hydrocarbon concentration of several thousand parts per million or less (i.e., a large quantity of an exhaust gas having a volume of 10,000 $m^3$/hr to more than 200,000 $m^3$/hr and having an extremely dilute volatile hydrocarbon concentration of 2000 ppm or less) does not have to be made to combust; i.e., carbon dioxide gas is not released, and volatile hydrocarbons contained in the exhaust gas can be recovered as a liquid. This is one method among those used for purifying an exhaust gas in order to comply with legally established anti-pollution regulations. In addition, the present invention provides the abovementioned method in order to achieve "zero emissions" with regard to volatile hydrocarbons.

In summary, problems that the present invention is intended to solve include:

1) providing a purification method for reducing carbon dioxide gas emissions to "zero," as carbon dioxide gas is the crucial drawback of combustion systems conventionally used in the relevant industrial field;

2) providing an exceptionally economical purification method in which an adsorption method is used to separate and recover volatile hydrocarbons from large quantities of exhaust containing dilute volatile hydrocarbons, and the hydrocarbons are intended to be re-used as "high-purity liquid hydrocarbons;" and 3) providing a suitable purification method wherein a large quantity of exhaust gas containing dilute volatile hydrocarbons is used, the dilute volatile hydrocarbons contained in the exhaust gas are concentrated in advance in a pretreatment step to a concentration of up to 10 times, and the adsorption method and desorption method proposed by the present inventors are subsequently incorporated, so that a "zero emission" level is achieved.

Means for Solving the Abovementioned Problems

According to claim 1, a method for purifying large quantities of exhaust gas containing dilute volatile hydrocarbons according to the present invention, which is used as means for solving the abovementioned problems, is a method for purifying exhaust gas characterized in that "adsorption units" that comprise a layer loaded with a precoated mesoporous activated carbon as an adsorbent, and that alternatingly perform adsorption and desorption, are used; an exhaust gas containing volatile hydrocarbons is caused to pass through one of the adsorption units; the volatile hydrocarbons are adsorbed on the adsorbent layer inside the adsorption unit; the exhaust gas that contains substantially no volatile hydrocarbons is released from an outlet of the adsorption unit; the other adsorption unit is switched to a desorption operation during this interval; and the previously adsorbed volatile hydrocarbons are extracted from the system wherein the purification method is characterized in that a "pretreatment unit" for concentrating the volatile hydrocarbons contained in the exhaust gas in advance is used to increase the concentration before a treatment is performed using the adsorption unit; and the pretreatment unit is a honeycomb-structure rotor or a fixed honeycomb in which a mesoporous activated carbon pre-coated using the volatile hydrocarbons is used in the adsorbent layer.

With respect to carbon dioxide gas emission regulations and preventing pollution, treating large quantities of exhaust gas containing dilute volatile hydrocarbons using the means described above makes it possible to purify the exhaust gas to zero emission; efficiently separate and reuse the volatile hydrocarbons in the exhaust gas; and, particularly, to accomplish the first through third objectives.

According to claim 2, the method for purifying large quantities of exhaust gas containing dilute volatile hydrocarbons according to the present invention is characterized in that in the "adsorption unit," a vacuum pump and/or air or nitrogen are used during desorption; the adsorption/desorption switching time is 1 to 30 minutes; the resulting purge exhaust gas is cooled and extracted from the system; and uncondensed gas is returned to an inlet of the adsorption unit.

According to claim 3, the method for purifying large quantities of exhaust gas containing dilute volatile hydrocarbons according to the present invention is characterized in that in the "pretreatment unit," a vacuum pump and/or normal-temperature air or nitrogen are used during desorption; and adsorption and desorption are carried out in advance in an associated operation with the adsorption unit described in the first aspect. As described above, nitrogen is used in order to avoid hazards when the concentration of hydrocarbons in the purge gas in the "pretreatment unit" exceeds the combustion lower limit.

According to claim 4, the concentration of the volatile hydrocarbons in the released gas can be purified to 10 parts per million or less by using the treatment system.

The amount of exhaust gas treated in the present invention is preferably ten thousand cubic meters per hour or greater, and the concentration of volatile hydrocarbons contained in the exhaust gas is preferably ten thousand parts per million or less. It is thereby possible to achieve the objects described above.

KEY TO SYMBOLS

Figure 1:
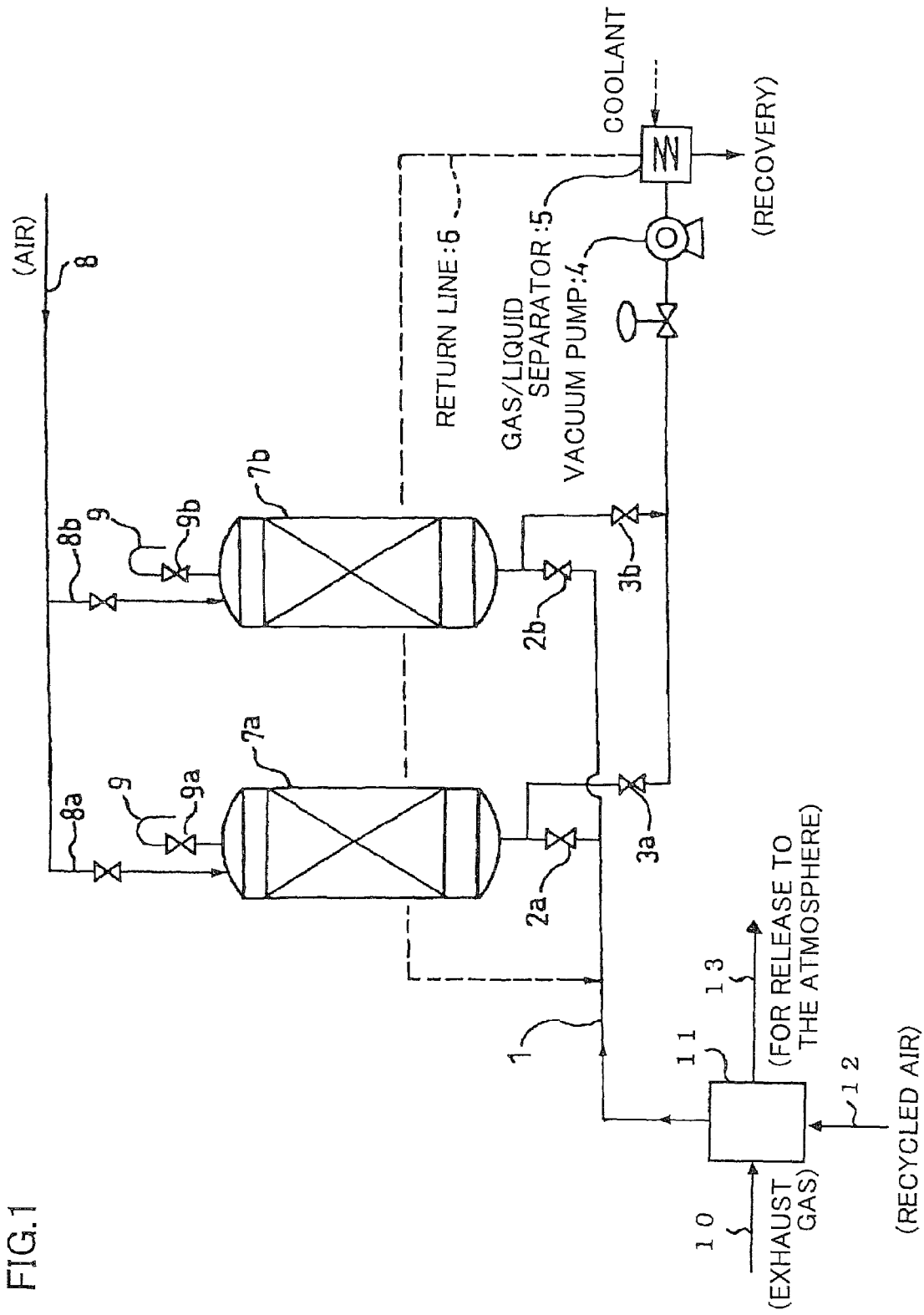
FIG. 1 is a flow sheet diagram showing one embodiment of the purification method according to the present invention.

1 Concentrated gas supply line
2a, 2b, 3a, 3b Electromagnetic valves
4 Vacuum pump
5 Gas/liquid separator
6 Uncondensed gas return line
7a, 7b Adsorption columns
8, 8a, 8b Air (purge gas) supply lines
9 Line for releasing gas into the atmosphere
9a, 9b Electromagnetic valves
10 Exhaust gas supply line
11 Honeycomb rotor
12 Recycled air supply line
13 Line for releasing gas into the atmosphere
10a, 10b Feedstock gas supply lines
12a, 12b Purge gas supply line
14 Line for releasing gas into the atmosphere
15 Concentrated gas line
15a, 15b Electromagnetic valves
21a, 21b Fixed honeycomb

BEST MODE FOR CARRYING OUT THE INVENTION

A detailed description shall be provided below of the present invention as well as embodiments thereof (In the following description, "HC gas" refers to "volatile hydrocarbons" in the exhaust gas used in the present invention).

The embodiments of the present invention include a "pretreatment unit" for concentrating in advance and extracting dilute volatile hydrocarbons contained in an exhaust gas to a concentration of up to ten times when large quantities of exhaust gas containing dilute volatile hydrocarbons are treated. This "pretreatment unit" comprises an adsorbent layer loaded with a mesoporous activated carbon that is precoated with the volatile hydrocarbons and that has an adsorption pore diameter of 10 to 100 Å. The concentrated gas extracted from the "pretreatment unit" is treated using a main unit (adsorption unit), which uses an adsorbent layer that is similarly filled with a precoated mesoporous activated carbon that has an adsorption pore diameter of 10 to 100 Å, or which uses this adsorbent layer in conjunction with an adsorbent layer that is precoated with a hydrophobic silica gel with a specified average adsorption pore diameter of 4 nanometers.

In the treatment performed using the main unit (adsorption unit), the switching between the adsorption operation and the desorption operation requires 1 to 30 minutes, and a vacuum pump is used with normal-temperature air or nitrogen in the purge operation. The purge exhaust gas from this operation is cooled and extracted from the system, and volatile hydrocarbons are recovered as a liquid.

(Exhaust Gas Used in the Invention)

The exhaust gas used in the invention is a large quantity of exhaust gas having a volume of a thousand cubic meters per hour to several ten thousand cubic meters per hour or greater, and emitted from paint factories, laundry facilities, and manufacturing steps involving chemical products, or the like. The exhaust gas contains dilute HC gas (e.g., ethylene, propylene, and other olefinic hydrocarbons; methanol and other alcohols; benzene, toluene, and other aromatic hydrocarbons; butadiene, hexene, styrene, and other diene polymers; trichlene, methylene chloride; ethyl acetate, and other carcinogens). The exhaust gas to be used is preferably of a large quantity exceeding 10,000 $m^3$/hr, and the dilute HC gas contained therein has a concentration of 10,000 ppm or less (i.e., the exhaust gas is of a large quantity exceeding 10,000 to 200,000 $m^3$/hr, and containing extremely dilute volatile hydrocarbons at a concentration of 20 ppm to 2000 ppm). However, this description is not provided by way of limitation.

(Activated Carbon Used in the "Adsorption Unit" and "Pretreatment Unit" in the Present Invention)

Activated carbon that is used in "adsorption methods using activated carbon" that are known in the art have innumerable fine pores composed of micropores, as described in catalogs published by activated carbon manufacturers such as Takeda Pharmaceutical Company, Kuraray Chemical Corporation, and Tsurumi Coal Corporation. A solid C—C bond is formed by a strong Van der Waals force between the carbon walls and the volatile hydrocarbons that are implanted and diffused deep within the pores. However, and despite the strong affinity, so-called capillary condensation occurs, and results in a massive amount of adsorption heat that exceeds the condensation heat, and a risk of fire is presented although usability is facilitated. Furthermore, it is known that steam or other heating means is necessary to separate the volatile hydrocarbons causing the capillary condensation from the micropores (see Non-Patent Reference 1 cited above), and desorption is not carried out by a vacuum pump, purging, or other such simple means.

When the mixed "HC gas" is a diene, an olefin, or the like, a drawback is presented in that the HC gas will contact in the multiple active sites present in the activated carbon, the components will be readily polymerized, and the polymerization heat creates a danger of ignition or combustion.

Therefore, when the activated carbon is used, steam must be used to carry out desorption, the "HC gas" is dissolved in the large quantity of water generated from the condensed steam, and costly wastewater treatment facilities are necessary in order meet Japanese water quality standards, which are the strictest in the world.

In order to solve the abovementioned problems, the present inventors discovered that the hazards accompanying the adsorption of volatile hydrocarbons could be avoided by replacing the activated carbon used in the prior art with a flame retardant activated carbon comprising mesopores having a fine pore size of mainly 10 to 100 Å (referred to as "MPC" hereinbelow), or forming a multilayer structure using MPC and a well-known noncombustible solid adsorbent; i.e., synthetic zeolite and/or hydrophobic silica gel. The present inventors also newly found that an adsorbent that readily absorbs volatile hydrocarbons yet does not absorb moisture can be obtained by varying the ratio of mesopores and micropores in the fine pores having the MPC.

These points have previously been proposed by the present inventors and have been demonstrated in a "swing system" used for small quantities of exhaust gas containing concentrated HC gas, as disclosed in Patent Reference 1 cited above.

However, this "swing" system is hazardous when used as means for treating large quantities of exhaust gas containing extremely dilute HC gas. Specifically, when a typical activated carbon having a small pore diameter is used, the temperature inside the adsorption column far exceeds 100° C. due to heat generated by capillary condensation in the fine pores, regardless of the several parts per million or less of the very dilute HC gas. Means for disposing a cooling coil inside the adsorption column has long been used to address such problems. As disclosed in Patent Reference 3 cited above, a method has also been proposed in which hydrocarbons (in liquid form) obtained when the purge exhaust gas is cooled is circulated inside the adsorption column, and the adsorption column is cooled using the resulting latent heat of evaporation.

The present invention solves the abovementioned problems by using an adsorbent that does not readily undergo capillary condensation, and which readily condenses large quantities of HC gas in the meso region; i.e., a mesoporous activated carbon (an activated carbon having an adsorption pore diameter in a range of 10 to 100 Å). (This activated carbon is referred to as a "canister," as described above. In Europe, the US, and other developed nations other than Japan, these canisters are used in systems for adsorbing gasoline vapor that leaks out when an automobile is traveling and, once a certain amount of vapor has accumulated, is desorbed upon fresh air being drawn in from the exterior. The purged exhaust gas is caused to combust in the engine compartment. Specifically, vehicles manufactured that do not employ this system cannot be exported, which is also applied to vehicles produced in Japan.)

In other words, desorption can be carried out using only a purge (air), but can be carried out more completely by using a vacuum pump in conjunction with the purge. The vacuum pump in this case has a small capacity. In the adsorption operation and desorption operation, the selection of the mesoporous activated carbon, which has been demonstrated to be a safe material, is a deciding factor in "the adsorption system and desorption system incorporating the pretreatment unit (pretreatment concentration unit)," which is a structural element of the present invention.

There follows a description of the "honeycomb rotor system" used in the prior art being used as an example of the pretreatment unit, which is an essential condition of the configuration of the present invention. High temperature air must be used as purge gas during desorption; therefore, it will be necessary to use silica gel or zeolite, which are completely noncombustible, and which have a far smaller adsorption capacity than MPC. This drawback can be overcome by using the MPC described above.

Furthermore, the MPC is preferably used after being coated in advance with "HC gas," as disclosed in Patent Reference 2 above. As a result thereof, the increase of temperature during adsorption is approximately 5° C., and increased safety can be ensured.

EMBODIMENTS OF THE PRESENT INVENTION

The purification method of the present invention is characterized in using "activated carbon having an adsorption pore diameter in the range of 10 to 100 Å," as described above, in conjunction with an pre-stage concentration unit (pretreatment unit) and a main unit (adsorption unit). However, this activated carbon can be used in conjunction with a precoated hydrophobic silica gel having a specified average pore diameter of 4 nanometers.

In cases where the exhaust gas is nearly saturated with moisture, it is preferable to jointly use hydrophobic silica gel having macropores and/or activated carbon having macropores; i.e., adsorbents that do not co-adsorb water.

In the purification method of the present invention, the desorption operation in the main unit (adsorption unit) is carried out with an operation pressure of atmospheric pressure or less, and desorption is carried out while using a small amount of purge gas. The purge gas is preferably a portion of the gas emitted from the main unit (adsorption unit), or dry air and/or nitrogen, or homogenous volatile hydrocarbons. The purge gas extracted using the desorption operation is preferably cooled, and the uncondensed gas is preferably returned to an inlet of the initial desorption unit (desorption column).

In the purification method of the present invention, a preferred alternative to means for varying the adsorbent when a large quantity of moisture is present is to carry out the desorption treatment in a state wherein the exhaust gas containing volatile hydrocarbons that is introduced into the pre-stage concentration unit (pretreatment unit) and/or main unit (adsorption unit) is pressurized or dehumidified in advance.

Example 1

"A case involving the treatment of an exhaust gas containing 500 ppm of ethyl acetate and having a volume of 5000 m$^3$/hr" is described below as a specific application example relating to the present invention, with reference being made to FIG. 1. FIG. 1 is a flow sheet diagram showing one embodiment of the purification method according to the present invention. In the diagram, 10 is an exhaust gas supply line; 11 is a honeycomb rotor; 12 is a recycled air supply line; 13 is a line for releasing gas into the atmosphere; 1 is a concentrated gas supply line; 2a, 2b, 3a, and 3b are electromagnetic valves; 4 is a vacuum pump; 5 is a gas/liquid separator; 6 is an uncondensed gas return line; 7a, 7b are adsorption columns; 8, 8a, and 8b are air (purge gas) supply lines; 9 is a line for releasing gas into the atmosphere; and 9a, 9b are electromagnetic valves.

The present example is a case in which an exhaust gas (moisture content: 13% at relative humidity (at 57° C.)) is treated, wherein the exhaust gas contains 500 ppm of ethyl acetate and has a volume of 5000 m$^3$/hour, as described above. The honeycomb rotor 11 is used as the concentration unit (pretreatment unit) in a pretreatment stage. The method previously developed by the present inventors; i.e., a PVSA method in which a vacuum pump and/or air is used during desorption, and adsorption and desorption are alternately repeated (see Patent Reference 1 cited above), is used in the equipment for collecting the concentrated ethyl acetate (volatile hydrocarbons).

Specifically, as shown in FIG. 1, in the pretreatment stage, the exhaust gas containing ethyl acetate is supplied to the honeycomb rotor 11 via the exhaust gas supply line 10, at which point the ethyl acetate is adsorbed, and the exhaust gas is released into the atmosphere from the gas line 13 that is open to the atmosphere. Meanwhile, recycled air is supplied to the honeycomb rotor 11 from the recycled air supply line 12, the adsorbed ethyl acetate is desorbed and extracted as "exhaust gas having a high concentration (concentrated gas)."

Next, the concentrated gas is treated using the PVSA method. Specifically, the concentrated gas is supplied to the adsorption column 7a (7b) via the concentrated gas supply line 1, at which point the ethyl acetate is adsorbed. The concentrated gas is subsequently released into the atmosphere from the gas line 9 that is open to the atmosphere. Meanwhile, purge air is supplied from the air (purge gas) supply lines 8, 8a, (8b) to the adsorption column 7a (7b) after the adsorption step has concluded. The purge air is suctioned by the vacuum pump 4, and the ethyl acetate is desorbed. (In the present example, "air" is used as the purge gas, but a portion of the gas released into the atmosphere from the adsorption column 7a (7b) can also be used.)

The purge exhaust gas containing the adsorbed ethyl acetate is supplied to the gas/liquid separator 5, and the ethyl acetate is recovered as a liquid. Uncondensed gas from the gas/liquid separator 5 is returned to the concentrated gas supply line 1 via the uncondensed gas return line 6.

In the present example, the adsorbent used in the honeycomb rotor 11 and the adsorption columns 7a, 7b is a mesoporous activated carbon (an activated carbon having an adsorption pore diameter in the range of 10 to 100 Å), and is precoated with ethyl acetate.

For the sake of comparison, an example (comparative example) is given of a case in which an ordinary "microporous activated carbon" is used in the honeycomb rotor 11, instead of the "mesoporous activated carbon."

When the "microporous activated carbon" in the comparative example is used, the ethyl acetate concentrated by the honeycomb rotor 11 has a concentration of about 5 times or approximately 2500 ppm. Air having a temperature of about 180° C. is used during desorption, but is cooled to about 50° C. prior to the PVSA method used in the post-treatment. Treating the gas containing concentrated ethyl acetate using the PVSA method makes it possible to reduce the concentration in the released gas to 100 to 200 ppm.

In contrast, when the "mesoporous activated carbon" in the present example is used, normal-temperature air can be used in the desorption performed by the honeycomb rotor 11, and the purge amount may be approximately ⅓ to ⅕ of that of the prior art. The concentration can therefore be increased approximately 15 to 20 times, and an effect is accordingly achieved whereby zero emissions are possible.

In the present example, despite the volume of the exhaust gas being 5000 m³/hour, and the ethyl acetate contained therein being a dilute amount of 500 ppm, the ethyl acetate content is concentrated to 5 to 15 times in the pretreatment stage, whereby the ethyl acetate can be recovered as a liquid using the PVSA method in a post-treatment stage, and the concentration of ethyl acetate that is released can then be reduced to zero. In this regard, the present example is not only superior from a cost standpoint to conventional combustion systems for treating large quantities of exhaust gas, but is also advantageous in that carbon dioxide gas emissions, which is the overriding drawback of combustion methods, are reduced to zero.

Another advantage is that the ethyl acetate, which combusts into carbon dioxide gas in combustion methods, is not released as smoke, and can be completely recovered. The economical effects thereof are therefore immeasurable.

Second Specific Practical Example of the Present Invention

Figure 2:
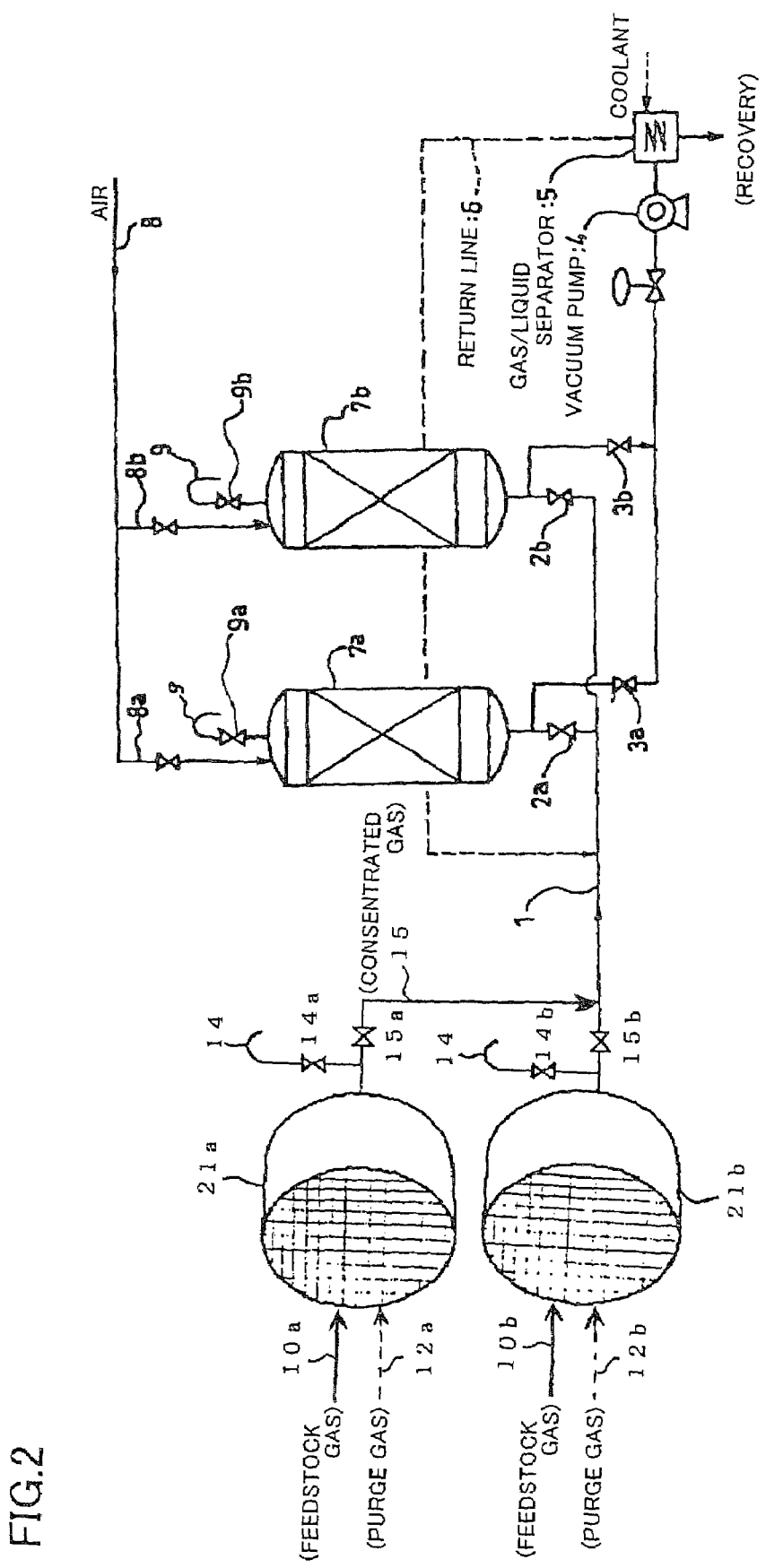
FIG. 2 is a flow sheet diagram showing another embodiment of the purification method according to the present invention.

The second specific practical example of the present invention will be described on the basis of FIG. 2. FIG. 2 is a flow sheet diagram showing another embodiment of the purification method according to the present invention, and is an example wherein "fixed rotors 21a, 21b" are used instead of the "honeycomb rotor 11" in FIG. 1 cited above.

As shown in FIG. 2, the present example is an example in which air containing dilute hydrocarbons is treated using a main unit, which has adsorption columns (desorption columns) 7a, 7b loaded with an adsorbent, a vacuum pump 4, a concentrated gas supply line 1, an unconcentrated gas return line 6, air (purge gas) supply lines 8, 8a, and 8b, and a line 9 for releasing gas into the atmosphere; and fixed honeycombs 21a, 21b composed of a mesoporous activated carbon are used as a pretreatment unit of the main unit.

In FIG. 2, the numerical symbols 2a, 2b, 3a, 3b, 9a, 9b, 14a, 14b, 15a, 15b all signify electromagnetic valves. In FIG. 2, 10a and 10b are supply lines for introducing a feedstock gas into the fixed honeycombs 21a, 21b, and 12a, 12b are supply lines for supplying purge gas for purging the volatile hydrocarbons adsorbed and concentrated on the fixed honeycombs 21a, 21b. The purged gas is introduced into the concentrated gas supply line 1 via the concentrated gas line 15 in FIG. 2. The exhaust gas resulting from the adsorption of the volatile hydrocarbons using the fixed honeycombs 21a, 21b is released into the atmosphere from a line 14 for releasing gas into the atmosphere via the electromagnetic valves 14a, 14b.

In the present example, a product known as "HF-1" manufactured by the Cataler Corporation can be used as both the mesoporous activated carbon loaded into the adsorption unit (adsorption columns 7a, 7b) and the mesoporous activated carbon loaded into the pretreatment unit (fixed honeycombs 21a, 21b).

In the present example, "air containing 500 ppm of ethyl acetate" is supplied from the feedstock gas supply line 10a (10b) to the fixed honeycombs 21a, 21b, but the mesoporous activated carbon loaded into the fixed honeycombs 21a, 21b is precoated in advance with this gas.

The concentrated gas that has passed through the concentrated gas line 15 is delivered at a rate of 50 cm/s, and switching between the fixed honeycombs 21a and 21b occurs for about 10 minutes.

Tests were conducted under the conditions described above, resulting in an ethyl acetate concentration of about 10 ppm in the air released into the atmosphere from the fixed honeycomb 21a (21b) via the line 14 for releasing gas into the atmosphere.

The concentration of ethyl acetate was about 5000 ppm once air, which was used as a purge gas, had passed through the fixed honeycomb 21a (21b) from the purge gas supply line 12a (12b), passed through the concentrated gas line 15, and collected in the concentrated gas supply line 1 of the inlet of the adsorption column 7a (7b). It was confirmed that the ethyl acetate had been concentrated to about 10 times.

Next, the electromagnetic valves 2a, 2b were alternately switched at 10 minute intervals, and the concentrated gas was subjected to adsorption and desorption in the adsorption columns 7a, 7b. The resulting concentration of ethyl acetate was 1 to 2 ppm in the clean gas released into the atmosphere from the adsorption columns 7a, 7b via the line 9 for releasing gas into the atmosphere. A purge gas (air) was injected from the air supply line 8 (8a, 8b) in conjunction with the vacuum pump 4, as desorption means. The desorbed purge exhaust gas was cooled to about 3 to 5° C. using a refrigerant (Freon gas) in the gas/liquid separator 5, and the condensed ethyl acetate contained in the purge exhaust gas was recovered as a liquid. The uncondensed gas in the gas/liquid separator 5 was returned to the concentration gas supply line 1 of the inlet of the adsorption columns 7a, 7b from an uncondensed gas return line 6. The purge coefficient (α) was "2."

In the present example, "normal-temperature air" was used as the purge gas in the fixed honeycombs 21a, 21b and the adsorption columns 7a, 7b, but it is also possible to use "room-temperature nitrogen" instead. It is thereby possible to avoid danger even when the concentration of hydrocarbons in gas purged in the fixed honeycombs 21a, 21b exceeds the combustion lower limit, as described above. In cases where "nitrogen" is used, the nitrogen is thus preferably recovered and reused.

INDUSTRIAL APPLICABILITY

As described above, the method for purifying large quantities of exhaust gas containing dilute volatile hydrocarbons according to the present invention is a method in which the exhaust gas is purified using an "adsorption unit," comprising a layer formed by loading a precoated mesoporous activated carbon as an adsorbent, wherein adsorption and desorption are alternatingly performed. The purification method is characterized in that a "pretreatment unit" for concentrating volatile hydrocarbons contained in the exhaust gas is used in advance, and the concentration is increased before treatment is performed using the adsorption unit. Moreover, the adsorbent layer in the pretreatment unit is loaded with a mesoporous activated carbon precoated with the volatile hydrocarbons.

Using the above means to treat large quantities of exhaust gas containing dilute volatile hydrocarbons thus allows the exhaust gas to be purified to a zero emission level. In addition, an effect is achieved wherein the volatile hydrocarbons in the exhaust gas can be efficiently separated and reused. The industrial applicability of the present invention is therefore extremely dramatic.

The invention claimed is:

1. A method for purifying large quantities of exhaust gas containing dilute volatile hydrocarbons, wherein adsorption units that comprise a layer loaded with a precoated mesoporous activated carbon as an adsorbent, and that alternatingly perform adsorption and desorption, are used; an exhaust gas containing volatile hydrocarbons is caused to pass through one of the adsorption units; the volatile hydrocarbons are adsorbed on the adsorbent layer inside the adsorption unit; the exhaust gas that contains no volatile hydrocarbons is released from an outlet of the adsorption unit; the other adsorption unit is switched to a desorption operation during this interval; and the previously adsorbed volatile hydrocarbons are extracted from the system; wherein said purification method is characterized in that a pretreatment unit for concentrating the volatile hydrocarbons contained in the exhaust gas in advance is used to increase the concentration before a treatment is performed using said adsorption unit; and said pretreatment unit is a honeycomb-structure rotor or a fixed honeycomb in which a mesoporous activated carbon precoated using the volatile hydrocarbons is used in the adsorbent layer.

2. The method for purifying large quantities of exhaust gas containing dilute volatile hydrocarbons according to claim 1, wherein in said adsorption unit, a vacuum pump and/or air or nitrogen is used during desorption; the adsorption/desorption switching time is 1 to 30 minutes; the resulting purge exhaust gas is cooled and extracted from the system; and uncondensed gas is returned to an inlet of said adsorption unit.

3. The method for purifying large quantities of exhaust gas containing dilute volatile hydrocarbons according to claim 1; wherein in said pretreatment unit, a vacuum pump and/or normal-temperature air or nitrogen are used during desorption; and adsorption and desorption are carried out in advance in an associated operation with said adsorption unit.

4. The method for purifying large quantities of exhaust gas containing dilute volatile hydrocarbons according to claim 1, wherein the concentration of the volatile hydrocarbons in the exhaust gas that has been treated using said method is 10 ppm or less.

* * * * *